Patented Feb. 7, 1933

1,896,157

UNITED STATES PATENT OFFICE

WILLIAM S. CALCOTT, OF PENNS GROVE, NEW JERSEY, AND ALBERT S. CARTER, OF WILMINGTON, DELAWARE, ASSIGNORS TO E. I. DU PONT DE NEMOURS & COMPANY, OF WILMINGTON, DELAWARE, A CORPORATION OF DELAWARE

SULPHUR CHLORIDE REACTION PRODUCT

No Drawing. Application filed June 1, 1929, Serial No. 367,831. Renewed April 23, 1932.

This invention relates to a new class of products prepared from polymers of acetylene. More particularly, it relates to a process for reacting acetylene polymers with sulphur chloride to produce products of novel chemical constitution and characteristics which may be in the form of solids or liquids or intermediate substances.

It is known that by passing acetylene into a mixture of ammonium chloride, water, cuprous chloride and copper powder, unsaturated hydrocarbons of higher molecular weight are formed and may be separated by distilling them from the catalyst mixture. The water driven over during the distillation process is returned to the catalyst mixture which is then ready for retreatment with acetylene. The major product is a low boiling (80-85° C.) highly unsaturated oil, called divinylacetylene and having most probably the empirical formula $C_8H_6$, but there is also produced at the same time a substantial quantity of other polymerizable polymers of acetylene. Among these may be mentioned a polymer having most probably the empirical formula $C_8H_8$ and, therefore, a tetramer of acetylene, and a polymer believed to have the formula $C_4H_4$. These productes may be roughly separated by distillation.

Further, it has been shown that the mixture obtained as above, or the separated constituents thereof, under the influence of heat or by aging at ordinary temperatures, in the presence of air, further polymerize successively to an oily, then to a gelatinous, then to a resinous mass and finally yield a hard brittle resin having unusual resistance to the action of water and organic solvents. The oily product which is first formed is largely soluble in alcohol and acetone; the gelatinous polymer modification next formed is largely soluble in acetone but partly insoluble in alcohol; the resinous modification next formed is substantially insoluble in alcohol and slightly soluble in acetone, while the subsequent hard, brittle polymers are substantially insoluble in both alcohol and acetone. It will be understood that these successive polymerization products consist of a mixture of volatile and non-volatile compounds in various stages of polymerization, which compounds may be only roughly separated by dissolving, but may be separated by distillation. When the polymerization is carried only through the initial stages, by heating until an oily liquid is obtained, and the resulting product subjected to distillation to remove the unpolymerized fraction remaining therein, the non-volatile residue has the general properties of a bodied drying oil.

According to the present invention, any one or a mixture of the liquid acetylene polymers described above or a solution of either the solid or liquid polymers are caused to react with sulphur chloride, preferably under controlled conditions of temperature and/or solution, to obtain a new class of compounds.

In order to disclose the detailed preparation of the new materials the following specific examples are furnished by way of illustration.

Example 1

100 parts (by volume) of the acetylene polymer thought to be divinylacetylene is slowly treated with sulphur chloride at room temperature until reaction starts. The mixture is then cooled with a salt-ice mixture to control its violence while more sulphur chloride is added until 80 parts have been added in all. When the reaction has ceased, it is warmed to 100° C. giving a dark semi-plastic tar, which is in part, soluble in carbon disulphide and insoluble in water and alcohol.

Example 2

100 parts (by volume) of the liquid acetylene polymer mixture comprising divinylacetylene and 150 parts (by volume) of carbon tetrachloride are treated with 100 parts of sulphur chloride. The mixture is warmed to start the reaction (about 40° C.) and then cooled with ice water as necessary to control the violence of the reaction. When the mixture ceases to warm up, it is heated at 100° to volatilize the carbon tetrachloride, leaving a black plastic product.

Example 3

200 parts of a liquid acetylene polymer of high molecular weight, obtained by heating an acetylene polymer comprising divinylacetylene to about 85° for three hours and distilling off the volatile constituents, is treated with 1 part sulphur chloride in 1 part of toluene with stirring. The mixture so formed, containing probably 0.8% of the liquid reaction product, may be used as a coating composition as such in solution. It is a dark brown viscous liquid which upon drying in air forms a hard dry brittle solid film.

*Example 4*

Divinylacetylene is heated for approximately 5 hours at a temperature of approximately 85° C. in the absence of air. The product is diluted with 2 volumes of acetone which causes a precipitate of tacky- rubberlike consistency to separate from the solution. This is separated by decantation and a portion dissolved in benzene, solvent naphtha, or other suitable solvent. The solution is then treated with sulphur chloride in amount equal to about 1% of the weight of dissolved material. If desired the solvent may be evaporated from the sulphur chloride product, leaving it in the form of a thermoplastic solid.

As will appear from the above examples the liquid acetylene polymers may be treated directly with sulphur chloride; or they, or the soluble solid polymers as well, may be first dissolved in some unreactive sovent such as carbon tetrachloride or benzene, and then treated with sulphur chloride. It is therefore to be understood that where the term "liquid acetylene polymer" is employed it is intended to denote either a normally liquid polymer or a polymer contained in solution. Alternatively, the sulphur chloride may be in solution in a solvent for the reaction product and be added to the acetylene polymer which may or may not be in a liquid state.

To avoid a reaction with explosive violence, the temperature must be controlled and the use of a solvent in conjunction with cooling insures ample control. In the absence of a solvent, cooling in ice may become necessary and the addition of sulphur chloride should be slow.

The sulphur chloride may be added to the acetylene polymers in almost any proportion depending upon the nature of the final product desired. When added to the normally liquid polymers, the resulting product is apparently a mixture which, depending upon the amount of sulphur chloride reaction product present in proportion to the unreacted polymer, may be either in the form of a liquid or a solid. Thus, in general, if a large proportion of sulfur chloride is added to a normally liquid polymer, the resulting product will be in the form of a solid due to the predominance of the solid reaction product. The brittleness of this solid will be increased with an increase in the proportion of sulphur chloride added up to a limit of about 80% of sulphur chloride by weight. As the proportion of sulphur chloride is decreased below 80%, the brittleness decreases and with about 40% sulphur chloride a dark plastic solid is obtained.

A product of similar properties may be obtained by adding sulphur chloride to a solution of an acetylene polymer in an added volatile solvent and removing the solvent by heating as disclosed in Examples 2 and 4. These solid products may be recognized as a brown or black thermoplastic material varying from a gummy tar to a brittle solid, depending upon the quantities of sulphur chloride and polymer employed. This product has been found to consist of a mixture, the major portion of which is insoluble in benzene, carbon tetrachloride, alcohol, water, acetone and similar solvents. It is partially soluble in carbon bisulphide; cold sulphuric acid has little effect upon it, but hot concentrated sulphuric acid causes decomposition; hot 10 N sodium hydroxide removes a part of the chlorine contained in this material, leaving a substance of similar properties. It also possesses valuable adhesive properties in addition to non-reactivity and insolubility.

By reason of these unusual properties, this material has been found suitable for use in a variety of industrial applications as, for example, in the preparation of hot and cold molding compositions.

Decrease in the proportion of sulphur chloride added to the normally liquid polymer below about 40% results in further lowering the viscosity of the product. When about 5% of sulphur chloride is added to the normally liquid polymer the resulting product is obtained in the form of a liquid.

A liquid of similar properties may be prepared by dissolving a soluble solid polymer (obtained as illustrated in Example 4) or a normally liquid polymer in an added solvent for the reaction product and then treating with the surphur chloride. The concentration of the reaction product in such a liquid may obviously be controlled by the concentration of the polymer solution and by the quantity of sulphur chloride added and a solution of the desired properties thus obtained for direct use. Thus, whether the reaction product is obtained dissolved in an excess of the liquid polymer by adding small amounts of sulphur chloride to the undiluted polymer or is obtained in solution in an added volatile solvent, the resulting liquids are adapted for use in coating compositions and yield hard resistant films when spread upon a surface exposed to the air.

It would appear that the liquid products so obtained are probably merely solutions of the solid reaction product in either the unreacted liquid polymer or the added solvent.

The ultimate products obtained by saturating the acetylene polymers with sulphur chloride possess essentially the same physical properties irrespective of the polymer used. However, the properties vary with change in sulphur chloride content (as described) and by using more highly polymerized acetylene, a greater variety of products may be obtained, owing to the greater variation possible before saturation is reached.

As many apparently widely different embodiments of this invention may be made without departing from the spirit thereof, it is to be understood that we do not limit ourselves to the foregoing examples or description except as indicated in the following patent claims.

We claim:

1. As a new compound, the reaction product of a nonbenzenoid polymer of acetylene with sulphur chloride.

2. As a new compound, the reaction product of a liquid nonbenzenoid acetylene polymer with sulphur chloride.

3. As a new compound, the reaction product of a nonbenzenoid acetylene polymer and sulphur chloride in the presence of a solvent for the reaction product of the class consisting of non-reactive volatile solvents and liquid acetylene polymers.

4. As a new compound, a solution of the reaction product of a nonbenzenoid polymer of acetylene and sulphur chloride.

5. A new product obtainable by reacting a normally liquid nonbenzenoid acetylene polymer with from 0.5 to 80% of sulphur chloride, based on the weight of the polymer.

6. A new product obtainable by reacting a normally liquid nonbenzenoid acetylene polymer with from 0.5 to 40% of sulphur chloride, based on the weight of the polymer present.

7. As a new product, the reaction product of a nonbenzenoid polymer of acetylene and sulphur chloride in a normally liquid acetylene polymer.

8. As a new product, the solution obtainable by reacting a normally liquid nonbenzenoid acetylene polymer with not over 5% of sulphur chloride based on the weight of the polymer.

9. The process of forming a new compound which comprises reacting a nonbenzenoid polymer of acetylene with sulphur chloride.

10. The process of forming a new compound which comprises reacting a nonbenzenoid acetylene polymer with sulphur chloride in the presence of a solvent for the reaction product.

11. The process of forming a new compound which comprises reacting a nonbenzenoid polymer of acetylene with sulphur chloride in the presence of a solvent for the reaction product while maintaining such a quantity of the solvent unaffected that a liquid product results.

12. The process of forming a new compound which comprises reacting a normally liquid nonbenzenoid acetylene polymer with sulphur chloride.

13. The process of forming a new compound which comprises reacting a normally liquid nonbenzenoid acetylene polymer with from 0.5 to 80% of sulphur chloride based on the weight of the polymer.

14. The process of forming a new compound which comprises reacting a normally liquid nonbenzenoid acetylene polymer with not over 5% of sulphur chloride based on the weight of the polymer.

15. As a new product, the solution obtainable by reacting a normally liquid nonbenzenoid acetylene polymer with about 0.5% by weight of sulphur chloride.

16. As a new product, the solution obtainable by heating an acetylene polymer comprising divinylacetylene to about 80° C., distilling off the volatile constituents, and treating the nonvolatile residue with not over 5% of sulphur chloride.

17. As a new product, the solution obtainable by heating an acetylene polymer comprising divinylacetylene to about 80° C., distilling off the volatile constituents, and treating the nonvolatile residue with about 5% sulphur chloride.

18. The process of forming a new compound which comprises treating a normally liquid non-volatile nonbenzenoid acetylene polymer with about 5% of sulphur chloride dissolved in an inert solvent.

19. As a new compound, a solid reaction product obtainable by treating a normally liquid polymer of nonbenzenoid acetylene with at least 40% sulphur chloride based on the weight of the polymer present.

20. A coating composition comprising the product obtained by reacting a normally liquid, non-volatile, nonbenzenoid acetylene polymer with sulphur chloride.

In testimony whereof we affix our signatures.

WILLIAM S. CALCOTT.
ALBERT S. CARTER.